United States Patent [19]
Sugiura

[11] 3,992,576
[45] Nov. 16, 1976

[54] FLOATING DEVICE FOR INFORMATION DISC APPARATUS

[75] Inventor: Yoshinori Sugiura, Yokohama, Japan

[73] Assignee: Canon Kabushiki Kaisha, Tokyo, Japan

[22] Filed: Dec. 9, 1974

[21] Appl. No.: 530,932

[30] Foreign Application Priority Data
Dec. 13, 1973   Japan.............................. 48-140958

[52] U.S. Cl. .................. 178/6.6 DD; 179/100.3 V; 360/103
[51] Int. Cl.² ................... H04N 5/76; G11B 21/20; G11B 17/32; G11B 7/08
[58] Field of Search......... 178/6.6 R, 6.6 DD, 6.6 P, 178/6.7 A; 179/100.3 V, 100.41 L; 360/75, 103, 105, 102; 350/255, 84

[56] References Cited
UNITED STATES PATENTS

| | | |
|---|---|---|
| 3,005,676 | 10/1961 | Best et al. ............................. 360/103 |
| 3,511,149 | 5/1970 | Blattner et al. ...................... 350/255 |
| 3,668,666 | 6/1972 | Heffernan et al. .................... 360/75 |
| 3,702,461 | 11/1972 | Cantwell.............................. 360/103 |
| 3,829,622 | 8/1974 | Elliot ........................... 179/100.3 V |
| 3,894,180 | 7/1975 | Canino......................... 179/100.3 V |
| 3,914,541 | 10/1975 | Elliott ............................... 178/6.6 R |
| 3,927,252 | 12/1975 | Polley ................................. 360/103 |

Primary Examiner—Raymond F. Cardillo, Jr.
Attorney, Agent, or Firm—Fitzpatrick, Cella, Harper & Scinto

[57] ABSTRACT

A floating device available for use with various types of information disc apparatus, which is constructed with a floating surface providing a basis for floatation, a support member held at a predetermined distance from the floating surface, a floating body having a buoyancy with respect to the floating surface, and a movable member held by the support member at a distance variable with respect to the floating surface, the movable member resiliently holding the floating body. The device further includes a detector for detecting the position of the floating body relative to the movable member, and a device for moving the movable member to control the distance of the movable member with respect to the floating surface in accordance with the detection signal from the detector.

18 Claims, 12 Drawing Figures

FLOATING DEVICE FOR INFORMATION DISC APPARATUS

BACKGROUND OF THE INVENTION

2. Field of the Invention

This invention relates to a floating device resting on a recording or reproducing unit in a magnetic disc device or an optical disc device.

2. Description of the Prior Art

Floating devices of the dynamic pressure type have heretofore been most popular for application to the floating magnetic heads in the magnetic disc devices for electronic computers or in the video discs for the recording of still TV images. p In such a floating device of the dynamic pressure type, all the buoyancy for floating the device is created by a floating shoe. More specifically, the buoyancy is created, during high-speed rotation of the disc, by the dynamic pressure of gas flowing into between the surfaces of the floating shoe and the disc due to the curvature of the floating shoe surface, and the buoyancy is variable in proportion to the relative velocity of the shoe and the disc. Such a floating device is disclosed in an article entitled "A GAS FILM LUBRICATION STUDY" in *IBM Journal*, July, 1959.

The dynamic pressure type floating device causes the floating shoe to be floated up a minute distance from the disc, with the disc surface as the floating surface, by imparting a predetermined pressure force from a spring such that an air stream created over the disc surface by rotation of the disc is opposite in direction to the buoyancy acting on the floating shoe. The amount of such floatation is extremely small and usually of the order of 0.1 to several microns.

Since, as described, the amount of floatation of the dynamic pressure floating shoe floating over the disc is proportional to the relative velocity of the disc and the floating shoe, the floating shoe may touch the disc during the rest condition of the latter or when said relative velocity is low as at the starting or stoppage of the disc rotation, and this may impart damages to the disc or the floating element. To prevent this, a protecting mechanism has heretofore been provided for mechanically separating the floating shoe from the disc.

The protecting mechanism heretofore used has comprised a spring having one end attached to a fixed member, and the floating element including the floating show has been fixed to the other end of the spring. When the number of revolutions of the disc has attained a predetermined value, a plunger or the like pushes the spring to urge the floating element toward the disc, and under the other conditions, the pressure of the plunger is released to permit the floating element to be separated from the disc by the action of the spring.

In such protecting mechanism, however, the pressure spring with the floating element secured thereto is pushed toward the disc to move the floating element, and this has not only limited the stroke of the floating element but also made it difficult to provide any desired stroke. Therefore, the spacing between the disc and the floating element when they are separated must be maintained constant and accordingly, the thickness of the disc resting on the turn table must be constant. Any variation in the thickness of the disc or the configuration of the floating shoe forming the floating element would vary the pressure force taken by the floating element from the pressure spring during floatation, thus varying the amount of floatation of the floating element. Therefore, in the floating device equipped with such conventional protecting mechanism, it has been required that the disc used have a predetermined thickness, and this has greatly prevented wider applications of such devices.

Further, it is usually the case with the dynamic pressure type floating device that when the floatng shoe floats above the rotating circular disc, the relative velocity of the disc and the floating shoe and accordingly the buoyancy of the floating shoe is reduced as the shoe is moved radially inwardly of the disc, unless the velocity of the disc rotation is varied. The floating distance of the floating shoe is determined by the balance between the buoyancy and the resilient pressure force with which the pressure spring urges the floating shoe toward the disc surface, and in order to provide a predetermined amount of floatation irrespective of the relative velocity of the disc and the floating shoe, it is necessary to vary the pressure force of the spring in correspondence with the variation in the relative velocity, i.e. the position of the floating shoe in the radial direction of the disc.

In contrast with the above-described dynamic pressure type floating device, there are floating devices called the static pressure type. In such type of device, the buoyancy is provided not by the disc rotation but by forming an air cushion between the floating shoe and the disc with the aid of compressed air injected through a nozzle formed centrally of the floating shoe, and the amount of the buoyancy depends on the balance between the buoyancy and the pressure force with which the spring urges the floating shoe toward the disc surface, and not on the relative velocity of the floatng shoe and the disc.

Again in such static pressure type floating device, the disc surface and the floating shoe must be separated from one another during the rest condition of the device or when the pressure of compressed air is too low to provide a sufficient buoyancy, and it is necessary to provide a protecting mechanism similar to that used with the dynamic pressure type floating device. In this case agan, a predetermined thickness is required for the disc resting on the turn table and no arbitrary thickness is available for the disc.

SUMMARY OF THE INVENTION

It is therefore an object of the present invention to provide an improved floating device.

It is another object of the present invention to provide a floating device which is well suited for use with any of magnetic and optical disc devices. It is a further object of the present invention to provide a floating device equipped with a protecting mechanism for preventing a floating element from touching the surface of a disc to damage such surface.

It is still a further object of the present invention to provide a floating device which permits any desired thickness of disc to be used with a magnetic or an optical disc device and can float the floating element at a predetermined floating distance.

It is a further object of the present invention to provide a floating device which is almost equally applicable as the dynamic pressure type wherein the floating element is floated above the disc with the aid of an air stream created over the surface of the disc by rotation thereof and as the static pressure type werein the floating element is floated wit the aid of an air cushion created toward the disc surface by compressed air.

It is a further object of the present invention to provide a floating device which, when using a floating element of the dynamic pressure type, is usable with a device for correcting any variation in buoyancy dependent of the position of the floating element in the radial directon of the disc, to thereby ensure a predetermined floating distance.

Other objects, features and advantages of the present invention will become apparent to those skilled in the art from the following detailed description of the invention taken in conjunction with the accompanying drawings.

BRIEF DESCRIPTION OF THE DRAWINGS

of the arm shown in FIG. 2.

DESCRIPTION OF THE PREFERRED EMBODIMENTS

Figure 1:
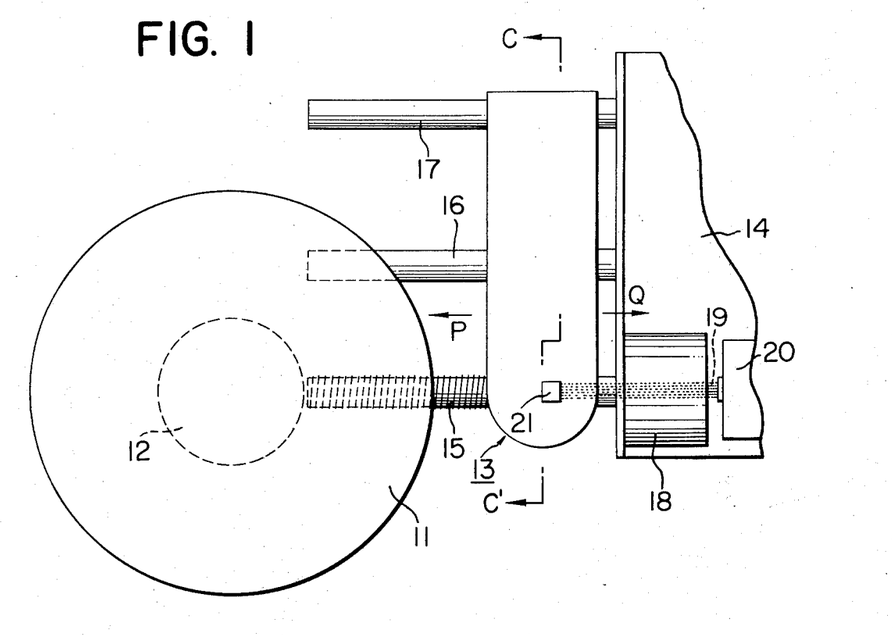
FIG. 1 is a perspective view showing an example of the optical disc information recording device to which the floating device of the present invention is applied.

Referring to FIG. 1, it is a plan view showing an optical disc information recording device in which information may be recorded very densely on a disc-shape recording medium by modulating a laser or like beam by information signals and applying such modulated beam to the disc-shaped recording medium while rotating the recording medium to cause relative movement of the laser and the recording medium.

The construction shown in FIG. 1 includes a disc-shaped recording medium 11 for optically writing information thereon, a motor 12 for driving to rotate the recording medium at a predetermined angular velocity, and an arm 13 located above the recording medium 11 and fixed to a holder member 22 (later described and shown in FIG. 4) slidably held by guide shafts 16 and 17 which each have one end secured to a bed 14 and extend toward and parallel to a radius of the recording medium 11, the holder member being threadably engaged with a drive shaft 15 which is mounted to the rotary shaft of a motor 18 fixed to the bed 14 and extends parallel to the guide shafts 16, 17 and radially of the recording medium 11. The arm 13 is laterally movable by rotation of the motor 18 and in the direction of a radiius of the recording medium 11, namely, in the direction of arrow P or Q. The recording device further includes a laser source 20 fixedly mounted on the bed 14 for emitting a laser beam 19 in a direction parallel to the axis of the drive shaft 15, the laser beam being modulated by informations signals, and a prism 21 provided on the arm 13 at a location corresponding to the axis of the drive shaft 15, which prism serves to direct the laser beam 19 downwardly so as to impinge on the recording medium 11 substantially at right angles therewith. In FIG. 1, the arm 13 is shown not in its recording position but in its rest position, from which the arm is movable in the direction of arrow P to start information writing from a point whereat the prism 21 comes to face the recording medium 11.

As described above, the axis of the drive shaft 15 corresponds to a radius of the recording medium 11, the laser beam 19 is emitted along a path corresponding to said axis and the prism is also disposed at a location corresponding to said axis, and this ensures the laser beam 19 to impinge on the recording medium always on one radius thereof when the arm 13 is moved to any position by energization of the motor 18. Therefore, by energizing the motor 12 to rotate the recording medium 11 while energizing the motor 18 to move the arm 13 in the direction of arrow P or Q, the laser beam 19 will scan the recording medium 11 describing spirals thereon. Thus, by imparting a suitable modulation to the laser beam 19 with the aid of necessary information signals, signal recording will occur along spiral tracks on the recording medium 11.

Figure 2:
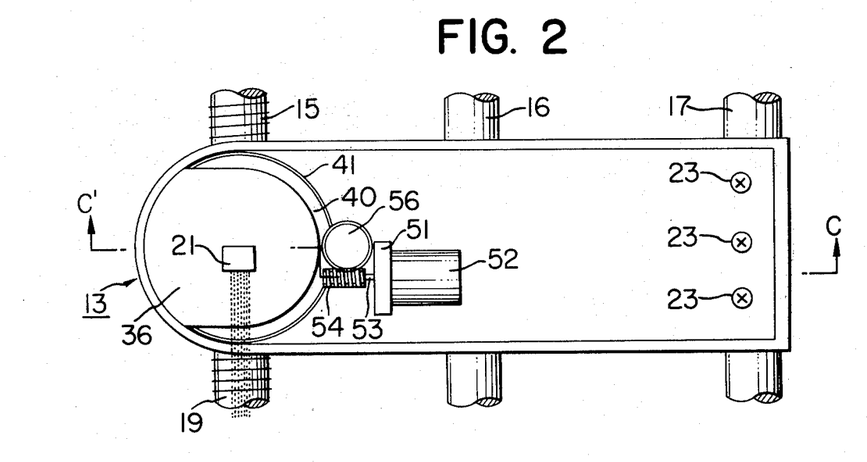
FIG. 2 is a plan view of the arm of FIG. 1 with the upper lid removed.
Figure 3:
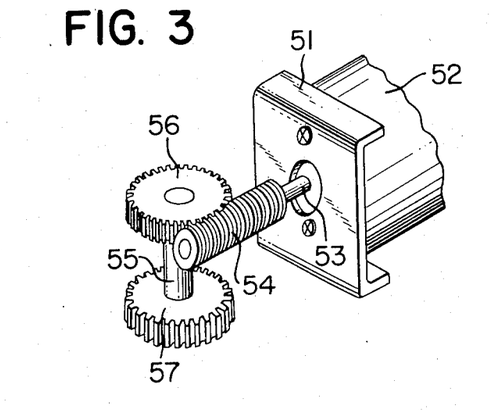
Figure 4:
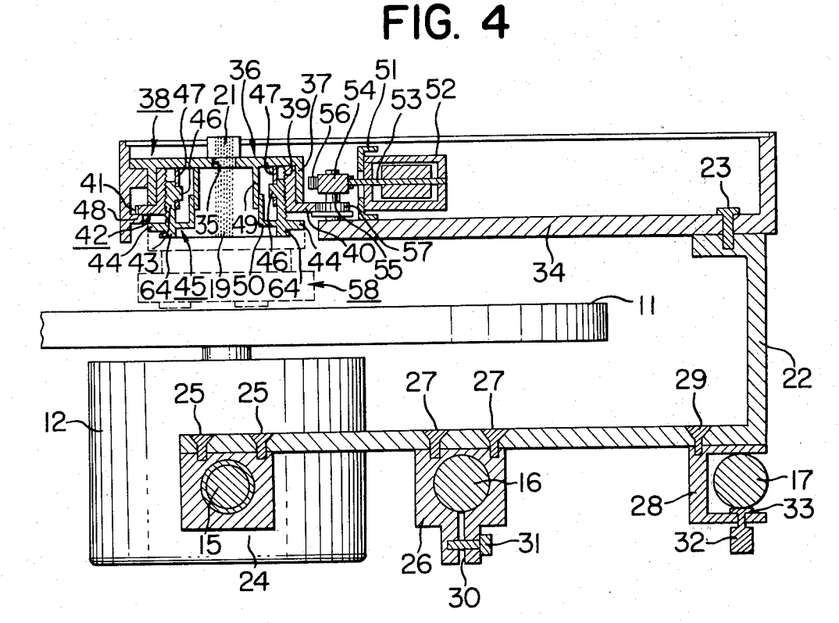
FIG. 4 is a cross-sectional view taken along line C—C' in FIG. 1 or 2.

FIG. 2 is a plan view showing the arm 13 of FIG. 1 with the upper lid removed, FIG. 3 is an enlarged, fragmentary, perspective view thereof, and FIG. 4 is a cross-sectonal view taken along line C—C' in FIG. 1 or 2 Referring to these figures, an L-shaped holder member 22 is secured to the arm 13 by means of screws 23, and a threaded portion 24 threadably fitted over the drive shaft 15 is secured to the underside of the holder member 22 at a lower end thereof by means of screws 25. A guide portion 26 slidably fitted over the guide shaft 16 is secured to the underside of the holder member 22 in the intermediate portion thereof by means of screws 27, and a guide portion 28 for slidably guiding the guide shaft 17 is secured to the underside of the holder member 22 at the opposite lower end thereof by means of screws 29. The guide portion 26 is designed such that the degree of its fitting to the guide shaft 16 is adjustable by providing a slit 30 formed in a portion of the guide member 26 and by adjusting the slit gap by means of a screw 31. The guide portion 28 is also designed such that its clearance with resepct to the guide shaft 17 is adjustable by inserting a screw 32 through the guide portion 28 from therebelow and by turning the screw 32 to vertically move a keep plate 33.

By securing the L-shaped holder member 22 to the arm 13 in the described manner, there may be provided a considerably great space between the underside of the arm 13 and the upper side of the holder member 22 and the recording medium 11 is located in such space in spaced relationship with the arm and the holder member. In other words, the recording medium is interposed between the overlying arm 13 and the underlying holder member 22 with spacings maintained with respect to both of them.

The arm 13 so held above the recording medium 11 by the holder member 22 has the prism 21 disposed thereon as described, and such prism is securely mounted on top of an upper base member 38 and over a through-aperture 35 formed in the top wall 36 thereof, the upper base member 38 having a downwardly extending cylindrical portion 37 and being secured to an arm base 34.

Within the upper base member 38, a drive cylinder member 42 is disposed for rotation relative to the member 38 and has a cylindrical portion 39 and a flanged portion 40 outwardly extending from the lower end of the cylindrical portion 39 and having a gear 41 formed on the outer circumference thereof.

Within the drive cylinder 42, a movable portion 45 is disposed and has a cylindrical portion 43 and a flanged portion 44 outwardly extending from the lower end of the cylindrical portion 43. The entire inner circumference of the drive cylinder 42 is formed with threads and the entire outer circumference of the cylindrical portion 43 forming the movable portion 45 is also formed with threads for mating with the threads of the drive cylinder, and through vertically extending apertures (not shown) formed in a protrusion 46 provided in the inner wall of the cylindrical portion 43, downwardly extending guide rods 47 are slidably passed each of which has one end secured to the top wall 36, so that rotation of the drive cylinder member 42 will permit the movable portion 45 to be vertically moved without being rotated. The underside of the flanged portion 40 of the drive cylinder member 42 is slidably supported by a protrusion 48 provided in a portion of the arm base 34, whereby said vertical movement is limited.

A cylindrical depending portion 49 extends downwardly from the upper base member 38, and a cylinder member 50 extends upwardly from the drive cylinder member 42 and slidably engages the clindrical depending portion 49. These serve to intercept any unnecessary extraneous light which whould otherwise invade the optical path from the prism 21 to the recording medium 11, and vertical movement of the movable portion 45 causes the upwardly extending cylinder member 50 to be moved in sliding engagement with the cylindrical depending portion 49.

A motor 52 is fixed to the arm base 34 in a portion thereof by means of a holder member 51, and a worm gear 54 is mounted on the rotary shaft 53 of the motor 52 in such a manner as to mesh with a gear 56 mounted on one end of a gear shaft 55 rotatably studded on the arm base 34. A further gear 57 is mounted on the lower end of the gear shaft 55 in such a manner as to mesh with the gear 41 provided on the outer circumference of the flanged portion 40 of the drive cylinder member 42.

Thus, rotation of the motor 52 in a suitable direction will cause the rotational force to be transmitted through the worm gear 54, gear 56, gear shaft 55 and gear 57 to the gear 41 on the outer circumference of the flanged portion 40 of the drive cylinder member 42 to rotate this drive cylinder member, whereby the movable portion 45 will be moved up or down without being rotated for the reason already set forth. It will be noted that reverse rotation of the motor 52 will cause the movable portion 45 to be moved in the opposite direction.

Figure 5A:
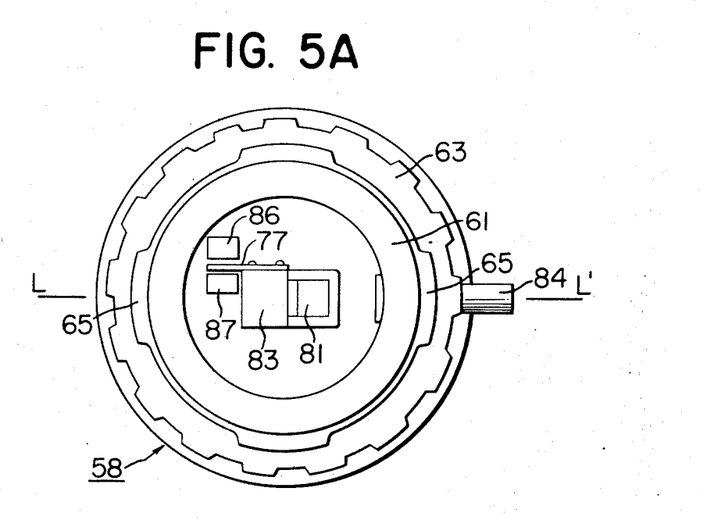
FIG. 5A is a top plan view of the recording head.
Figure 5B:
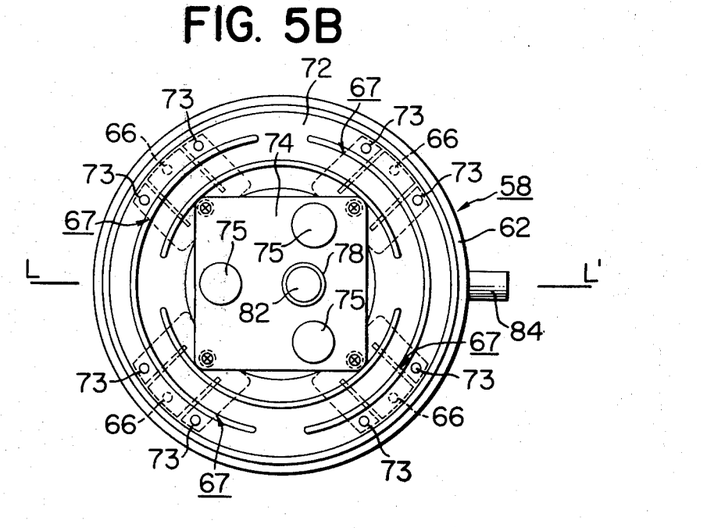
FIG. 5B is a bottom plan view of the recording head.

On that end of the movable portion 45 which is adjacent the recording medium 11, a recording head 58 having a floating shoe is detachably secured as indicated by dotted lines. Such head 58 will more particularly be described with reference to FIG. 5.

FIGS. 5A and 5B are a top plan view and a bottom plan view, respectively, of the recording head 58. The recording head 58 is secured to the movable portion 45 in such a manner that the drive shaft 15 extends in the direction L—L' with the L-shaped disposed adjacent the center of rotation of the recording medium and with the L'-side disposed adjacent the bed 14.

In FIG. 5, numeral 59 designates a base comprising a disc-like bed 60 having an upper cylindrical portion 61 and a lower cylindrical portion 62 both integrally formed with the bed 60, and a fastening ring 63 forming a bayonet mechanism is rotatably mounted around the upper clindrical portion 61 at the upper end thereof.

A clearance slightly greater than the wall thickness of the cylindrical portion 43 of the movable portion 45 is provided between the ring 63 and the upper cylindrical portion 61, and cut-aways 65 are formed in the ring 63 so as to correspond to and receive pawls 64 formed at four points on the circumference of the cylinderical portion 43 at the lower end thereof. Thus, by inserting the pawls 64 of the movable portion 45 into the respective cut-aways 65 and thereafter rotating the ring 63 through one-eighth of 360°, the recording disc 58 may be secured to the movable portion 45, as indicated by dotted lines in FIG. 6.

Figure 7:
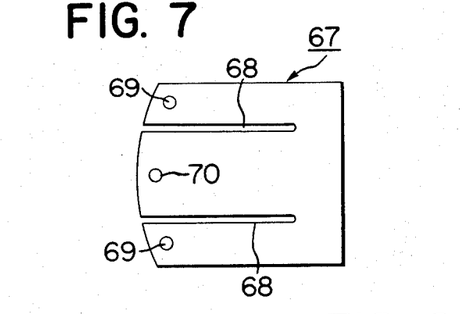
FIG. 7 is a plan view of a resilient member.

Four depending portions 66 downwardly extend from the underside of the bed 60, and such a resilient plate 67 as shown in FIG. 7 is secured to each of the depending portions 66. Each resilient plate 67 is made of a metal or other resilient material and formed with two slits 68 and through-apertures 69 and 70 in one end portion thereof. By locating the resilient plates 67 in the manner as indicated by dotted lines in FIG. 5B, and then causing the through-apertures 70 of the resilient plates to be inserted over the depending portions 66, the resilient plates 67 may be secured to the depending portions 66. To each resilient plates 67 so secured to the bed 60, a circular gimbal spring 72 is secured with a spacer 71 interposed therebetween.

Such gimbal springs 72 have secured thereto a floating portion floatable by a dynamic pressure during rotation of the recording medium 11, which floating portion comprises a bed 74, floating shoes 75, an optical system 76 and a light-intercepting member 77. More specifically, the bed 74, rectangular in configuration, is secured to the gimbal spring 72, and these floating shoes 75, each of which is disc-shaped and has an underside curved with a curvature of several meters, are fixedly disposed in a triangular array.

All the buoyancy that causes the floating portion to float is produced by the floating shoes 75, and the production of such buoyancy occurs due to the dynamic pressure of the gas flowing into between the surfaces of the floating shoes 75 and the recording medium 11 with the aid of the aforementioned curvature during high-speed rotation of the recording medium 11.

Figure 6:
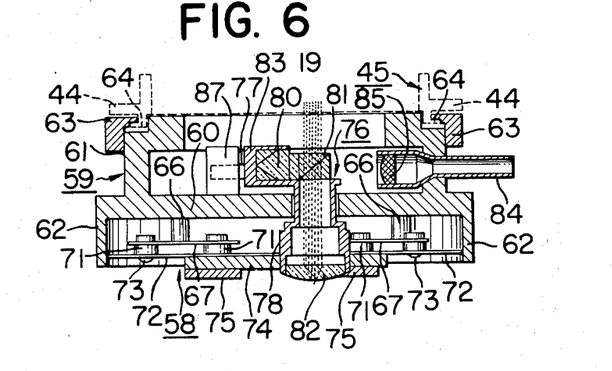
FIG. 6 is a cross-sectional view taken along line L—L' in FIG. 5B.

The optical system 76 is vertically movable by being inserted through an opening formed through the bed 60, and is tightly fitted in an opening formed through the bed 74 of the floating portion. Such optical system includes a beam splitter 81 for downwardly passing therethrough part of the laser beam 19 applied from above and for directing the other part of the laser beam into a corner cube 80, a focusing lens 82 for causing the laser beam 19 passes through the beam splitter 81 to be focused upon the recording medium 11, a lens barrel portion 78 for securing the lens 82 thereto, and a holding portion 83 integrally formed with the lens barrel portion 78 to hold the corner cube 80 at a predetermined position with respect to the focusing lens 82. The entire optical system 76 is secured to the bed 74 by fixing the lens barrel portion 78 to the bed 74.

In a portion of the upper cylindrical portion 61, a lens barrel 84 and a lens 85 are provided to observe therethrough the interference between a first beam which is passed to the beam splitter 81 thereabove and directed thereby to the corner cube 80 for changing the course of the beam by 180° and passed back to and through the beam splitter 81 by the corner cube 80 and a second beam which is passed through the beam splitter 81 from thereabove and projected upon the recording medium 11 through the focusing lens 82 and partly reflected by the recording medium 11 to travel back through the focusing lens 82 and deflected toward the lens 85 by the beam splitter 81. Through such observation, the manner in which the beam passed through the focusing lens 82 is focused on the recording medium 11, that is, the distance between the recording medium 11 and the optical system may be measured.

Figure 8:
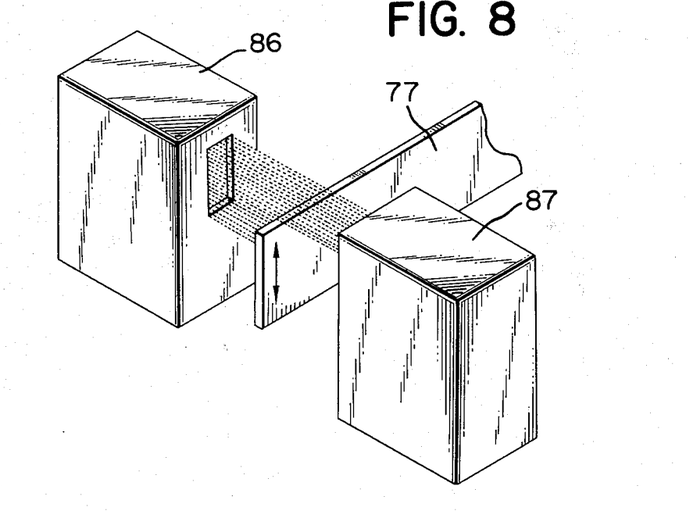
FIG. 8 is a perspective view of reslative position detector means.

A light-intercepting member 77 is further secured to the holding portion 83. Such light-intercepting member 77 is disposed with one end thereof lying between a light-emitting portion 86 and a light-receiving portion 87 for receiving the from the light-emitting portion 86, the two portions 86 and 87 being both fixed on the bed 60 at locations independent of the vertical movement of the optical system, and as shown in FIG. 8, the light-intercepting member 77 is designed such that its vertical movement varies the quantity of light received by the light-receiving portion 87.

The light received by the light-receiving portion 87 is converted into an electrical signal, whereafter such signal is used as a control signal for controlling the motor 52 shown in FIG. 2, thereby controlling the vertical positions of the movable portion 45 and the base 59 secured thereto.

Figure 9:
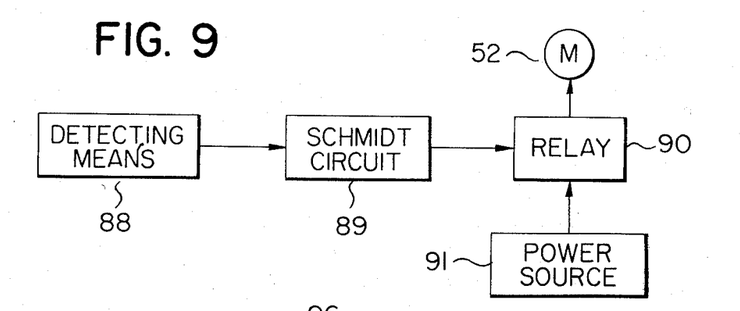
FIG. 9 is a block diagram of the control circuit.

FIG. 9 is a block diagram of the control circuit for controlling the motor 52 by the electrical signal from the light-receiving portion 87. The output of a detecting means 88, which is comprised of the light-emitting portion 86, light-intercepting member 77, light-receiving portion 87 (FIG. 8) and unshown photoelectric converter element and rests on the recording head 58, is applied to a Schmidt circuit 89 resting on the arm 13 and the output of the Schmidt circuit 89 controls a relay 90 resting on the arm 13 to permit voltage application from a voltage source to the motor 52, thereby drivingly control the motor 52.

This control circuit may be designed, for example, such that it controls the motor 52 so as to cause the movable portion 45 to move toward the recording medium 11 as long as the light-receiving portion 87 receives the light from the light-emitting portion 86 but that it stops the motor 52 from rotating as soon as no light is received by the light-receiving portion.

Therefore, assuming that at the initiation of the recording on the recording medium 11, the movable portion 45 is in sufficiently lifted position to provide a sufficient distance between the floating shoe 75 and the recording medium 11, then the floating portion carrying thereon the optical system and the like is lowered due to gravity by the weight thereof is supported by the resiliency of the resilient plates 67 and gimbal springs 72 so that the floating shoes 75 are sufficiently spaced apart from the surface of the recording medium 11. Under such conditions, closing of a start switch (not shown) of the information recording device energizes the motor 12 to rotate the recording medium 11 and when a predetermined number of rotations is attained, power is supplied to the control circuit which is thus operated. As described above, when there is a sufficient distance between the floating shoes and the recording medium 11, no bouyancy is acting on the floating shoes 75 so that the floating portion carrying thereon the optical system and the like remains lowered due to gravity and thus, the light-intercepting member 77 also remains lowered. This permits the light from the light-emitting portion 86 to reach the light-receiving portion 87 to thereby start the motor 52, thus lowering the movable portion 45 and the recording head 58 secured thereto. Such lowering of the recording head 58 continues because the quantity of light received by the light-receiving portion 87 is not varied until buoyancy begins to act on the floating shoes 75.

As the recording head 58 further continues to lower and buoyancy begins to act on the floating shoes 75, the floating portion is only lowered over a minute distance even if the movable portion 45 or the base 59 of the recording head 58 is lowered, and the downward force imparted to the resilient plates 67 and gimbal springs 72 by the weight of the floating portion begins to be decreased by the buoyancy. As a result, the floating portion is upwardly moved relative to the base 59 and thus, the buoyancy of the floating portion, whose weight has so far been supported by the resilient plates 67 and gimbal springs 72, is now controlled by the resilient pressure force of the resilient plates 67 and gimbal springs 72. At this time, the amount of floatation of the floating portion is after all determined by said resilient pressure force, namely, the amount of deflection of the resilient plates 67 and gimbal springs 72.

The lowering of the base 59 varies the degree of light-interception effected by the light-intercepting member 77, and such variation continues until the quantity of light reaching the light-receiving portion 87 assumes a predetermined value to stop the lowering of the movable portion 45. More spcifically, when the quantity of light reaching the light-receiving portion 87 assumes the predetermined value, the motor 52 is stopped and thus the movable portion 45 is stopped from lowering. This means that the amount of deflection of the resilient plates 67 and gimbal springs 72 having reached a predetermined value has been detected and that such amount of deflection is to be maintained. The predetermined amount of deflection attained by the springs 67 and 72 also means a predetermined downward resilient pressure force applied to the floating portion and thus, the floating portion is caused to float upwardly to a predetermined distance from the recording medium 11 by a predetermined buoyancy corresponding to the downward resilient pressure force.

Through the above-described operation, the floating portion can be caused to float to a predetermined distance from the recording medium 11 in whatever vertical position its recording surface may lie.

Accordingly, the focusing lens 82 resting on the bed 74 of the floating portion afloat at a predetermined distance with respect to the recording medium 11 can maintain such predetermined distance with respect to the recording medium so as to enable necessary signals to be accurately recorded in a spiral form on the recording medium 11 with modulation imparted to the laser beam 19 by necessary signal and with the motor 18 rotated to feed the arm 13 radially of the recording medium.

When the recording is thus completed with the arm 13 brought to a predetermined position, the control circuit is deactivated and the motor 52 is rotated in the reverse direction to lift the recording head 58 and detect that the floating shoes 75 have been sufficiently spaced apart from the recording medium 11 or that the recording head 58 has been lifted to its upper limit, whereupon the drive motor 12 for the recording medium 11 is stopped.

Adjustment of the amount of floatation of the floating portion, namely, detection of whether or not the laser beam 19 from the focusing lens 82 is focused to the recording surface of the recording medium 11 may easily be accomplished by knowing the conditions of the interference fringe observable through the interference optical system comprised of the beam slitter 81, corner cube 80, lens 85, etc. However, adjustment of the amount of floatation may be done only by adjusting the vertical position or configuration of the light-intercepting member 77 and moreover, this light-intercepting member 77 may be suitably set for each detachable recording head 58 to which it is provided and therefore, no special adjustment of the floating distance will be required even if the recording head 58 is replaced by another.

In the foregoing embodiment, any surface variation of the recording medium during its rotation would cause vertical vibration of the floating portion which in turn would vary the quantity of light reaching the light-receiving portion 87 to make it difficult to maintain stable operation of the relay. It is therefore preferable to provide the Schmidt circuit 89 and the like with a hysteresis characteristic so that the relay 90 will not operate for surface vibration of the order of ten and several microns, i.e. vertical vibration of the floating portion.

The floating device described in the foregoing embodiment is of the dynamic pressure type, in which the buoyancy of the floating shoes 75 depends on the relative velocity of such shoes and the recording medium 11 and the buoyancy is necessarily different from the outer peripheral area to the inner peripheral area of the recording medium 11.

This may be avoided by detecting the position then assumed by the arm 13 in the radial direction of the recording medium 11 and by adjusting the buoyancy of the floating shoes 75, namely, the suppression force of the springs against the buoyancy, in accordance with the detected position of the arm.

Such adjustment may be accomplished by using the motor 52 to vertically lower the movable portion 45 during initiation of the operation and lift the floating position with a predetermined buoyancy, thereafter disconnecting the motor 52 from the control circuit but drivingly connecting the motor 52 to a servo control system which effects control by the detection signal of the radial position of the arm 13 with respect to the recording medium 11, then gradually lifting the movable portion 45 with the radially inward movement of the arm 13 with respect to the recording medium to thereby gradually decreasing the suppression force imparted to the buoyancy of the floating portion by the resilient pressure of the springs 67 and gimbal springs 72 so that the suppression force becomes balanced with the buoyancy of the floating portion which gradually decreases with the radially inward movement of the arm, thus maintaining the buoyancy constant.

Alternatively, said adjustment may be done by providing an electromagntic solenoid in addition to the springs 67 and 72 to obtain therefrom the resilient suppression force against the buoyancy of the floating portion, providing a variable resistor or the like variable with the radial position of the arm 13 to derive a variable current from such resistor, using such variable current to gradually decrease said suppression force of the electromagnetic solenoid with the radially inward movement of the arm 13, so that the suppression force becomes balanced with the buoyancy of the floating portion which gradually decreases with the radially inward movement of the arm, thus maintaining the buoyancy constant.

As a further alternative method, it is possible to provide a mechanial linkage in addition to the springs 67 and 72 to obtain therefrom the resislient suppression force against the buoyancy of the floating portion, to provide another spring for varying the resilient pressure force, to provide a mechanical linkage driven by radial movement of the arm 13, to use this linkage to gradually decrease the resilient pressure force of said another spring with the radially inward movement of the arm so that the resilient pressure force becomes balanced with the buoyancy of the floating portion which gradually decreases with the radially inward movement of the arm, thus maintaining the buoyancy constant.

Since the first and second alternative methods mentioned above employ electric control circuits, the designs therefor will readily become apparent to those skilled in the art without drawings and description thereof and need not be described any further.

With regard to the third method mentioned above, an example of the mechanical linkage for adjusting the buoyancy is shown in the perspective view of FIG. 10 and the construction and operation thereof will hereinafter be described in detail.

Figures 10, 11:
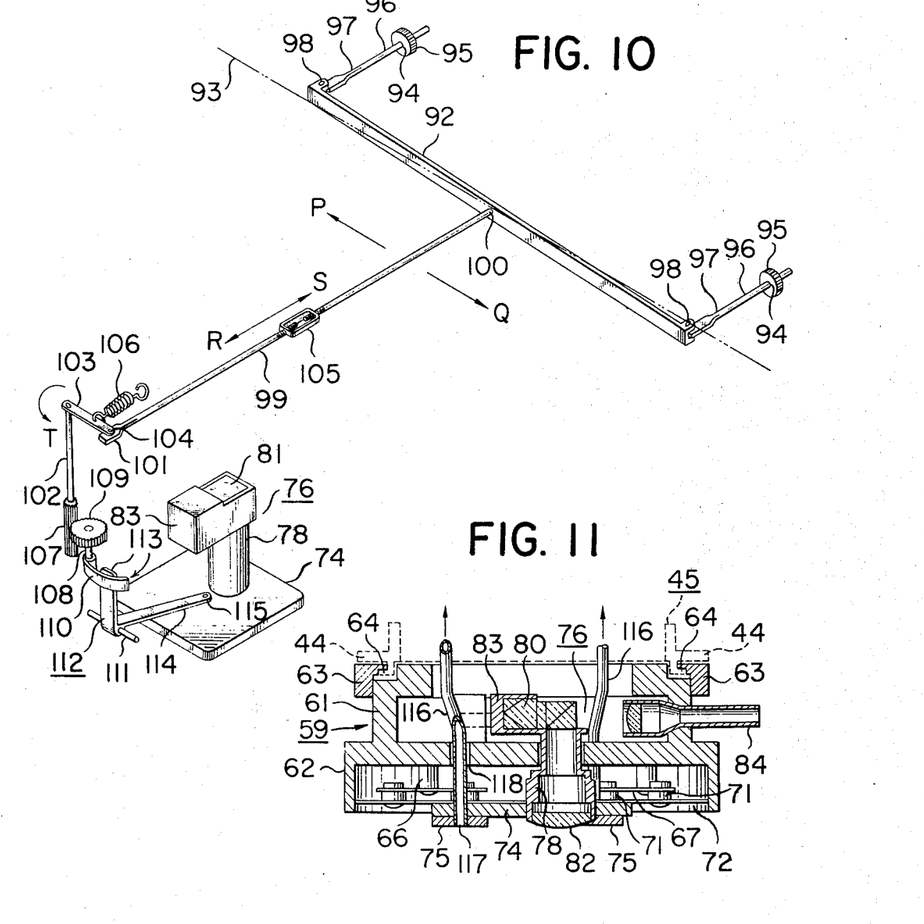
FIG. 10 is a perspective view of a mechanical linkage.
FIG. 11 is a vertical section of the recording head portion of the optical disc information recording device to which the floating device according to another embodiment of the present invention is applied.

In FIG. 10, numeral 92 designates an inclined plate inclined with respect to a line 93 parallel to the drive shaft 15 of the arm 13 so that the portion thereof which corresponds to the outer peripheral area of the recording medium 11 is adjacent to the arm 13 while the portion thereof which corresponds to the inner peripheral area of the recording mdium is remote from the arm 13. The opposite ends of the inclined plate 92 are pivotally connected to adjust rods 97 by means of pins 98, each of which adjust rods is pivotally mounted to an unshown member fixed to the bed 14 and has a threaded intermediate portion 96 threadably receiving thereon an adjust dial 95 internally threaded at 94. A suitable amount of rotation of the adjust dial 95 may move the adjust rod 97 toward or away from the arm 13 to vary the degree of inclination of the inclined plate. Designated by 99 is a movable rod movable within the arm 13 in the direction of arrow R or S, namely, lengthwise of the arm 13, and having one end 100 slidably abutting with the inclined plate 92 and the other end 101 connected to a lever 103 by means of a pin 104, which lever 103 is pivotally mounted on one end of a shaft 102 rotatably supported on a portion of the arm 13 or the upper bed 38. The length of the movable rod is variable by means of a turn buckle mechanism 105 provided intermediately thereof. The lever 103 is spring-biased in the direction of arrow S by a spring 106 to urge the end 100 of the movable rod 99 into resilient abutment. An elongated gear 107 is mounted on the lower end of the shaft 102 and meshes with a gear 109 mounted on one end of a shaft 108 rotatably mounted in portion of the recording head 59. The gears 107 and 109 are designed such that they maintain their mutual engagement to ensure transmission of rotational force even if their supporting shafts 102 and 108 vary the axial postiions thereof . A swinging lever 110 is secured to the other end of the shaft 108 and bears against one end portion 113 of an L-shaped plate spring 112 pivotally spported on a shaft 111 provided on a portion, for example, bed 60, of the recording head 59. The extremity of the other arm portion 114 of the L-shaped plate spring 112 resiliently urges the floatation center of the bed 74 of the floating portion toward the recording medium 11, which floating portion includes the bed 74 resiliently supported to the recording head 59 by means of springs 67 and gimbal springs 72, lens barrel 78, holding portion 83, beam splitter 81, etc., and such resilient pressure force is controlled by the clockwise biasing force imparted to the end 113 of the plate spring 112 by the swinging lever 110.

In the described arrangement, the floating portion is subjected to the resilient pressure force not only by the springs 67 and 72 but also by the L-shaped plate spring 112, and the balance between all such resilient pressure forces and the buoyancy maintains the floating portion at a constant floating level. When the arm 13 is moved radially inwardly of the recording medium 11 or in the direction of arrow P, the relative velocity of the floating portion and the recording medium 11 is slowed down to decrease the buoyancy of the floating portion. At the same time, the movable rod 99 is moved in the direction of arrow S by the inclination of the inclined plate 92 and by the bias of the spring 106 as the arm 13 is moved radially inwardly of the recording medium 11 or in the direction of arrow P, in accordance with the position of the arm 13 with respect to the circumference of the recording medium 11. Thus, the lever 103 mounted on the shaft 102 is rotated in the direction of arrow T by an amount corresponding to the amount of movement of the arm 13, whereby the gear 107 mounted on the other end of the shaft 102 is also rotated by the same amount. Such rotational force is transmitted to the gear 109 and accordingly to the shaft 108, which thus swings the swinging lever 110 in the direction of arrow U to decrease the clockwise pressure force applied to the L-shaped plate spring 112. This decreases the resilient pressure force imparted to the floating portion and toward the recording medium by the L-shaped plate spring 112, so that such resilient pressure becomes balanced with the buoyancy of the floating portion which decreases with the radially inward movement of the arm 13 with respect to the recording medium 11, thus maintaining the amount of floatation at a constant level.

The rate of variation in accordance with the resilient pressure force imparted to the floating portion by the L-shaped plate spring 112 and the position of the arm 13 with resepct to the circumference of the recording medium 11 may be set as desired, by suitably adjusting the turn buckle portion 105 and the adjust dials 95.

The above embodiment has secifically been described with respect to a floating device using floating shoes of the dynamic pressure type which are caused to float by an air stream created over a recording medium in motion, whereas the present invention, excepting for the buoyancy adjusting mechanism utilizing the radial position of the arm, is equally applicable to the devices which use the so-called static pressure type floating shoes which are caused to float by an air cushion provided by compressed air injected toward the recording medium. Thus, the detecting device as shown and described with respect to FIGS. 8 and 9, as well as the driving devices for the movable member 45 as shown and described in connection with FIGS. 3 and 4, are equally applicable to the embodiment of the invention shown in FIG. 11.

FIG. 11 shows, in vertical section, the recording head portion of an optical disc information recording device using floating shoes of the static pressure type according to another embodiment. In the construction shown there, an injection port 117 for compressed air supplied through a flexible air pipe 116 is formed in the center of each floating shoe 75 and the compressed air injected through such injection port 117 may form an air cushion between the floating shoe 75 and the air curtain to lift the floating portion. Each air pipe 116 extends through an aperture 118 formed through the bed 60 and is connected directly or through a regulating valve to an unshown air tank having its internal air pressure accurately regulated.

Such static pressure floating shoes 75 may have their buoyancy controlled by adjustment of the pressure of the compressed air used for the floatation, but as in the case of the dynamic pressure type, it is required to provide a protecting mechanism for preventing contact between the recording medium 11 and the floating portion or maintaining the floating shoes 75 lifted during the inoperative condition of the device or when the compressed air pressure is too low to provide a sufficient buoyancy. Therefore, in actual operation, the recording head 59 including the floating shoes 75 must be lowered toward the surface of the recording medium 11 and in such case, a predetermined pressure of compressed air is injected through the injection ports 117 of the floating shoes 75 while the movable portion 45 is gradually lowered toward the recording medium until it is detected , by means of the detecting device shown and described hereinbefore in connection with the embodiment of FIGS. 8 and 9, that the amount of deflection of the springs 67 and gimbal springs 72 has assumed a predetermined value, whereupon the lowering of the movable portion 45 is stopped by means of the driving device as shown and described hereinbefore in connection with the embodiment of FIGS. 3 and 4, whereby the floating portion may be provided with a predetermined amount of floatation which results from the balance between a predetermined buoyancy provided by the predetermind pressure of compressed air and a predetermined resilient pressure force provided by the pedetermined deflection of the springs 67 and 72. On the other hand, fine adjustment of the floating amount may be accomplished by fine adjustment of the compressed air pressure. It will thus be appreciated that the floating device of the present invention is equally applicable to both the dynamic pressure type and the static pressure type.

Further, the floating device of the present invention is not restricted to the type which utilizes air pressure to effect the floatation, but is equally applicable to the type which utilizes magnetic or electrostatic repulsion to effect the floatation.

In the foregoing, the floating device of the present invention has been described with respect only to its application to an optical information recording device in which necessary signals are written on a disc-shaped recording medium by optical means, whereas the present invention is not restricted to such applicaton but is equally applicable to any of recording devices, reproducing devices or recording-reproducing devices which have floating portions and in which recording or reproduction is effected magnetically, mechanically or otherwise.

The means for detecting the relative positions of the recording head base and the floating portion or the amount of deflection of the srings resiliently urging the floating portion is not limited to the above-described light-detector means comprising a light-emitting portion, a light receiving portion and a light-intercepting plate, but may of course be any of the types which utilize variation in magnetic force or capacity or mechanical microswitches.

For example, a combination of a reed switch or Hall element or Sony magnetic diode provided on the recording head base and a magnet provided in the floating portion will detect the relative positions of the floating portion and the recording head base by magnetic means; a combination of light-emitting and light-receiving portions provided on the recording head base and a mirror provided in the floating portion will detect the relative positions of the floating portion and the recording head base by such a design that the light from the light-emitting portion enters the light-receiving portion through the mirror when the relative positions assume a predetermined relationship. Any of these drives and stops the recording head driving motor through the control circuit system as shown in FIG. 9 or similar control circuit.

The detection method utilizing a microswitch will realize the most simple control circuit, in which a microswitch provided on the recording head base is designed to be mechanically actuated by a portion of the floating portion, whereby the switch is opened or closed to drive or stop the recording head driving motor when the relative positions of the recording head base and the floating portion assume a predetermined relationship.

Also, the detection method utilizing the variation in electrostatic capacity or inductance to detect the relative positions of the recording head base and the floating portion may effectively be adopted.

For example, in the control method utilizing electrostatic capacity, an electrode plate provided on the recording head base and an electrode plate provided on the floating portion cooperate to form an electrostatic capacity portion and the variation in the relative positions of the head base and the floating portion is substituted for by the variation in the opposed areas of the two electrodes or the relative distance therebetween to thereby vary the electrostatic capacity, and then the frequency of an oscillator driven by such electrostatic capacity is converted into a voltage through a frequency discriminating circuit, whereafter a Schmidt circuit detects a predetermined voltage value to operate a relay circuit to drive or stop the recording head driving motor.

On the other hand, in the control method utilizing inductance, a combination of a coil provided on the recording head base and a core provided on the floating portion causes the variation in the relative positions of the recording head base and the floating portion to be substituted for by the variation in coil inductance, and the frequency of an oscillator driven by such inductance is converted into a voltage by a frequency discriminating circuit, whereafter a Schmidt circuit detects a predetermined voltage value to operate a relay circuit to drive or stop the recording head driving motor.

The information recording or reproducing medium used with the present invention is not restricted to the disc-shaped one but planar or drum-shaped medium is equally available. Particularly, where the static pressure type floating shoes are employed, the recording or reproducing head may freely run over a planar information recording medium in X- and Y-directions. The present invention is also applicable to the cases where computer output is used to effect photoetching or a metal plate to form a pattern thereon or to effect automatic drafting on a photosensitive medium.

Thus, the floating device of the present invention has a very wide range of application and it will be apparent that a great variety of embodiments may be possible without departing from the spirit and scope of the invention. Therefore, the present invention is restricted only by the appended claims and not limited to the specific embodiments disclosed herein.

I claim:
1. A floating device comprising in combination:
    a. a floating surface providing a basis for floatation;
    b. a fixing member provided in confrontation to said floating surface;
    c. a movable member held by said fixing member in such a manner that the distance between said movable member and said floating surface is variable;
    d. a floating body having a buoyancy with respect to said floating surface;
    e. a resilient member which supports said floating body resiliently at the one side of said movable member facing said floating surface;
    f. shifting means provided at at least one of, said fixing member and said movable member, for varying the distance between the said movable member and said floating surface;
    g. detecting means mounted on at least one of, said movable member and said floating body, for detecting a relative position with respect to said movable member; and
    h. control means which causes said movable member to seperate from said floating surface by means of said shifting member, when said floating body has the least or no bouyancy, and also causes said movable member to shift toward said floating surface by means of said shifting means until the relative distance between the movable member and the floating body on the basis of a detected output from said detecting means reaches a predetermined value, when said floating body has buoyancy.

2. The floating device as claimed in claim 1, wherein said floating body is provided at the one side thereof directed toward said floating surface with at least one floating shoe which is floatable with a certain space interval being maintained with respect to said floating surface by a high pneumatic pressure created toward said floating surface.

3. The floating device as claimed in claim 2, further comprising means for forming said floating surface on a rotating disc surface, and, at the same time, for forwarding said fixing member in a direction parallel to the radial direction of the disc so as to forward said floating body in the radial direction of the disc.

4. The floating device as claimed in claim 2, wherein said resilient member elastically lowers down said floating body, when said floating body has no buoyancy, and imparts a resilient force to said floating body, when said floating body has buoyancy, so as to resiliently urge said floating body toward said floating surface.

5. The floating device as claimed in claim 4, wherein said resilient member is constructed with a gimbal spring provided substantially in parallel with said floating surface.

6. The floating device as claimed in claim 2, further including pressurized air ejecting ports provided on the one side of said floating shoe facing toward said floating surface so as to obtain a high pneumatic pressure to impart buoyancy to said floating shoe by means of pressurized air fed between said floating surface and said floating shoe.

7. The floating device as claimed in claim 6, wherein said detecting means comprises a light receiving element and a light intercepting plate separately mounted on said floating body and said movable member, said light intercepting plate varying the amount of light received by said light receiving element, and a detected signal output being given in correspondence to the relative distance from said light receiving element.

8. A floating device comprising in combination:
   a. a floating surface providing a basis for floatation, and comprising a surface of an information medium having at least one of the characteristics of, information recording and reproduction;
   b. a fixing member provided in confrontation to said floating surface;
   c. a movable member held by said fixing member in such a manner that the distance between said movable member and said floating surface is variable;
   d. a floating body having a buoyancy with respect to said floating surface;
   e. an information element mounted on said floating body to perform at least one of the functions of, information recording and reproduction, with respect to the surface of said information medium;
   f. a resilient member which supports resiliently said floating body at the one side of said movable member facing said floating surface;
   g. shifting means provided at at least one of, said fixing member and said movable member, for varying the distance between said movable member, for varying the distance between said movable member and said floating surface;
   h. detecting means mounted on at least one of, said movable member and said floating body, for detecting the relative position of said floating body with respect to said movable member; and
   i. control means which causes said movable member to separate from said floating surface by means of said shifting member, when said floating body has the least or no buoyancy, and also causes said movable member to shift toward said floating surface by means of said shifting means until the relative distance between the movable member and the floating body based on the detected output from said detecting means reaches a predetermined value, when said floating body has buoyancy.

9. The floating device as claimed in claim 8, wherein the surface of said information medium has at least one of the characteristics of, optical information recording and reproduction and, at the same time, said information element is constructed with an optical lens system.

10. The floating device as claimed in claim 8, wherein said floating body is provided at the one side thereof directed toward said floating surface with at least one floating shoe which is floatable with a certain space interval being maintained with respect to said floating surface by a high pneumatic pressure created toward said floating surface.

11. The floating device as claimed in claim 10, further comprising:
    means for moving said floating surface and said floating body relative to each other in a direction where the relative distance between the floating surface and the floating body is not varied; and
    at least one surface, which is non-parallel with said floating surface and which is provided at the one side of said floating shoe facing toward said floating surface, being provided so as to obtain high pneumatic pressure to impart buoyancy to said floating shoe by the relative movement of said floating surface and said floating member.

12. The floating device as claimed in claim 10, wherein said resilient member resiliently lowers down said floating body, when said floating body has no buoyancy, and imparts a resilient force to said floating body, when said floating body has buoyancy, so as to resiliently urge said floating body toward said floating surface.

13. The floating device as claimed in claim 12, wherein said resilient member is constructed with a gimbal spring provided substantially in parallel with said floating surface.

14. The floating device as claimed in claim 10, further comprising means for moving and holding said movable member away from said floating surface, when there is no relative movement of said floating surface and said floating body and no buoyancy present in said floating body.

15. The floating device as claimed in claim 14, wherein said floating surface is formed on the surface of a rotatable disc.

16. A floating device comprising in combination:
    a. a floating surface providing a basis for floatation, and comprising a surface of a disc-shaped recording medium, on which information may be optically written;
    b. means for rotating said disc-shaped floating surface;
    c. a fixing member provided in confrontation to said floating surface;
    d. a movable member held by said fixing member in such a manner that the distance between said movable member and said floating surface is variable;
    e. a floating body provided on the one side thereof facing said floating surface with at least one floating shoe which is floatable with a certain space interval being maintained with respect to said floating surface by creation of a high pneumatic pressure at the one side thereof facing toward said floating surface;
    f. a resilient member which sports resiliently said floating body at the one side of said movable member facing said floating surface, said resilient member causing said floating body to lower when said floating body has no buoyancy, and imparting to said floating body a resilient force so as to resiliently urge said floating body toward said floating surface;
    g. shifting means provided at at least one of, said fixing member and said movable member, for varying the distance between said movable member and said floating surface;

h. detecting means mounted on at least one of, said movable member and said floating body for detecting a relative position of said floating body with respect to said movable member, said relative position between said movable member and said floating body corresponding to the amount of deflection of said resilient body, or a resilient force to urge said floating body toward said floating surface;

i. an optical system mounted on said floating body for writing information in an optical manner with respect to said surface of the recording medium, said optical system converging a light signal modulated by said information onto said surface of the recording medium;

j. control means which causes said movable member to separate from said floating surface by means of said shifting member, when said floating body has the least or no buoyancy, and also causes said movable member to shift toward said floating surface by means of said shifting means until the relative distance between the movable member and the floating body which is made known on the basis of a detected output from said detecting means reaches a predetermined value, i.e. while the amount of deflection of said resilient body reaches a predetermined amount, when said floating body has buoyancy, the floating quantity of said floating body reaching an expected value owing to a balance between buoyancy of said floating body and a resilient pressure force toaward said resilient body, when the amount of deflection of said resilient body reaches the predetermined value, whereby a converging point of an information light relative to the optical system mounted on said floating body substantially coincides with the surface of said recording medium; and k. means for forwarding said floating body in the radial direction of the disc-shaped recording medium, and forwarding said fixing member in the direction parallel to the radial direction of the disc so as to carry out optical recording of the information on said recording medium, while drawing a spiral track.

17. The floating device as claimed in claim 16, further including pressurized air ejecting ports provided on the one side of said floating shoe facing toward said floating surface so as to obtain a high pneumatic pressure to impart buoyancy to said floating shoe by means of pressurized air fed between said floating surface and said floating shoe.

18. The floating device as claimed in claim 17, wherein said detecting means comprises a light receiving element and a light intercepting plate separately mounted on said floating body and said movable member, said light intercepting plate varying the amount of light received by said light receiving element, and a detected signal output being given in correspondence to the relative distance from said light receiving element.

* * * * *

UNITED STATES PATENT AND TRADEMARK OFFICE
CERTIFICATE OF CORRECTION

PATENT NO. : 3,992,576
DATED : November 16, 1976
INVENTOR(S) : YOSHINORI SUGIURA It is certified that error appears in the above-identified patent and that said Letters Patent are hereby corrected as shown below:

Column 1, line 15, before "In", delete "p"; line 49, change "show" to -- shoe --.
Column 2, line 35, change "floatng" to -- floating --.
Column 3, between lines 21 and 22, insert -- FIG. 3 is an enlarged, fragmentary, perspective view --; line 44, change "shape" to -- shaped --.
Column 6, line 8, change "clindrical" to -- cylindrical --; line 61, change "passes" to -- passed --.
Column 7, line 22, change "the from" to -- the light from --.
Column 10, line 23, after "arm" insert -- 13 --; line 44, change "mdium" to -- medium --.
Column 11, line 5, change "postiions" to -- positions --; line 8, change "spported" to -- supported --.
Column 14, line 40, after "relative position", insert -- of said floating body --.
Column 15, lines 43 and 44, delete "for varying the distance between said movable member,".

Signed and Sealed this

Fifteenth Day of February 1977

[SEAL]

Attest:

RUTH C. MASON
*Attesting Officer*

C. MARSHALL DANN
*Commissioner of Patents and Trademarks*